(12) United States Patent
Wang et al.

(10) Patent No.: US 6,992,809 B1
(45) Date of Patent: Jan. 31, 2006

(54) MULTI-CONJUGATE LIQUID CRYSTAL TUNABLE FILTER

(75) Inventors: Xinghua Wang, Kent, OH (US); Chenhui Wang, Stow, OH (US)

(73) Assignee: ChemImage Corporation, Pittsburgh, PA (US)

( * ) Notice: Subject to any disclaimer, the term of this patent is extended or adjusted under 35 U.S.C. 154(b) by 0 days.

(21) Appl. No.: 11/049,064

(22) Filed: Feb. 2, 2005

(51) Int. Cl.
*G02F 1/01* (2006.01)
(52) U.S. Cl. .......................... 359/279; 349/18
(58) Field of Classification Search .............. 359/279, 359/278, 498, 499, 634; 349/18, 61, 97, 349/106, 117, 119
See application file for complete search history.

(56) References Cited

U.S. PATENT DOCUMENTS 6,310,673 B1 * 10/2001 Sharp .......................... 349/106

OTHER PUBLICATIONS

Yariv, A. Yeh, P. Optical Waves in Crystals, 1984, Chapter 5, John Wiley and Sons, New York.
Title, A.M. and Rosenberg, W. J., Opt. Eng. 20, p. 815, 1981.
Solc, J. Opt. Soc. Am. 55, p. 621, 1965.
Harris et al., J. Opt Soc. Am. 54, p. 1267, 1964.

* cited by examiner

*Primary Examiner*—Hung Xuan Dang
*Assistant Examiner*—Tuyen Tra
(74) *Attorney, Agent, or Firm*—Duane Morris LLP (57) ABSTRACT

A hyper-spectral imaging filter has serial stages along an optical signal path in a Solc filter configuration. Angularly distributed retarder elements of equal birefringence are stacked in each stage, with a polarizer between stages. The retarders can include tunable (such as abutted liquid crystals tuned in unison), fixed and/or combined tunable and fixed birefringences. Although the retardations are equal within each stage, distinctly different retardations are used for two or more different stages. This causes some stages to pass narrow bandpass peaks and other stages to have widely spaced bandpass peaks. The transmission functions of the serial stages are superimposed with selected preferably-tunable peaks coinciding. The resulting conjugate filter has a high finesse ratio, and good out of band rejection.

21 Claims, 6 Drawing Sheets

6-element Solc

FIG. 4

Two serial 6-element Solcs

FIG. 5

Stage 1 * Stage 2 . . .

* Stage 3 . . .

Conjugate Filter Transform Function

MULTI-CONJUGATE LIQUID CRYSTAL TUNABLE FILTER

BACKGROUND OF THE INVENTION

1. Field of the Invention

The invention concerns optical filters having tunable wavelength pass bands, for use in hyperspectral imaging. Optimizing considerations are employed to obtain a high filter finesse ratio using multiple stages, while at the same time keeping the optical power transmission ratio high.

The inventive tunable conjugate filter has multiple serially placed birefringence filter stages, each stage having a number of stacked retarder elements. Each stage of stacked retarder elements preferably has a Solc filter configuration for the stage. A Solc configuration denotes equal birefringence retarders stacked between polarizers. The retarder elements have a particular rotational relationship with one another. The retarders can be embodied as liquid crystal tunable birefringence stacked elements, or by stacked elements that have fixed retarders abutted with tunable birefringence liquid crystals. In other embodiments individual retarders are built up from two or more abutted liquid crystal elements. Several Solc stages can be used, each having a Solc succession of birefringence elements. The number of polarization filters is limited to the polarizers between the Solc stages. The transmission functions of the stages are superimposed, each stage contributing to further narrow the passband or to increase the free spectral range between passbands. The result is a high finesse suitable for hyperspectral imaging. The filter is tunable to spaced bands. The filters are particularly suitable for Raman chemical imaging and other applications that aptly require tuning versatility and a narrow pass band.

2. Prior Art

Optical bandpass filters that rely on birefringence are known in a number of different configurations. Birefringence is a characteristic of certain crystals wherein there is a difference in optical index for orthogonal light components that are aligned to aligned at 45° to the director (reference axis) of a birefringent crystal, the effective optical path lengths through the crystal are unequal for vector components that are parallel to the director, versus components that are perpendicular to the director. The crystal induces a differential phase delay or retardation.

The differential delay can cause a change or realignment of the polarization state of the light that propagates through the crystal. A given distance along an optical propagation path amounts to a greater phase angle if the wavelength is shorter, and a smaller phase angle if the wavelength is longer. If a birefringent crystal induces a differential time delay, that delay corresponds to a phase angle that is a greater or lesser phase angle, for shorter or longer wavelengths, respectively.

The polarization state of light involves the phase relationship between orthogonal light components, among other variables. Differential delay from birefringence can induce a rotational polarization realignment that is a function of the differential phase angle delay. Thus, birefringence provides a basis to discriminate for a particular wavelength. For example, a plane polarizing filter mounted at the output of a birefringent filter having an input with a nominal polarization alignment, will discriminate for the wavelengths in the output that are aligned with the polarizer.

In short, the light signal passing through a birefringent crystal is subjected to a differential delay. The differential delay alters the polarization alignment of the light signal by an angle that is a function of wavelength. One or more polarizers is provided along the optical path. The wavelengths or vector components that emerge in alignment with the polarizer are passed.

A stack of wavelength bandpass filter elements can be disposed along an optical signal path, the theory being that each stage should render the filter more discriminating. However, there are complications. For example, if the stages are not precisely aligned, particularly if subject to tuning, then light will be blocked rather than passed. Also, each stage is likely to cause some transmission loss. Thus by stacking stages the wavelength bandpass may become more discriminating but the ratio of passed light energy to input light energy at the desired wavelength can become unacceptably low.

Each polarizer has an inherent loss and will reduce the transmitted optical energy of a light beam even if the beam is plane polarized and aligned to the polarizer. The particular loss varies with the wavelength and the polarizer used, but might be, for example 12%. If a large number of stages are needed to provide a high degree of discrimination or a very narrow bandpass, the level of light energy passing the filter may be low. A low transmission ratio may require that light energy be collected for a relatively long time to obtain an image or a measurement.

Discrimination for a particular wavelength by altering polarization state produces a wavelength-periodic result. If the differential delay is $2\pi$ radians or an integer multiple thereof, for example, the effect is the same as no delay. Considering plane polarizers, if a polarization state is changed by a differential phase delay of an integer multiple of $\pi$ radians (180°), then a retarder and plane polarizing filter will pass the realigned light at two wavelengths.

Birefringence interference filters have been developed with plural stages using different combinations of retardation and polarization filtering to discriminate by wavelength. In certain configurations, stacked birefringence filters can provide very narrow spectral resolution. Early stacked birefringent crystal filters were developed for observing solar prominences and were configured by crystal thickness and rotational orientation to pass certain very specific, narrow and well defined spectral lines in the emission spectrum of solar radiation. In other applications, it is desirable that such filters be tunable.

Sub-angstrom spectral resolution is said to be obtained using a filter developed by B. Lyot (See, Comptes rendus 197, 1593 (1933)). A basic Lyot filter comprises a number of filter stages placed successively along a light path. (See, Yariv, A. and Yeh, P. (1984) Optical Waves in Crystals, Chapter 5, John Wiley and Sons, New York). Each stage has a birefringent crystal element (a retarder) between parallel polarizers. The exit polarizer of one element can function as the input polarizer of the next element.

The Lyot birefringent crystals have optical axes parallel to the interface and rotated by 45 degrees to the direction of the input polarization, thus dividing the light from the input polarizer into two components divided equally between the fast and slow axes of the birefringent crystal. In propagating through the crystal, the component on the slow axis becomes retarded relative to the component on the fast axis. The polarization orientation of the light is altered as well. At the output, the exit polarizer at 45 degrees to the preceding crystal retains equal proportions the retarded and the un-retarded components, but passes only that wavelength or wavelengths for which the angular polarization change through the crystal is the same as the relative alignment of the input and output polarizers (or that differs by an integer multiple of 180 degrees).

A Lyot filter has a repetitive layout of crystals between polarizers, each the crystals and their polarizers being relatively aligned at 45 degrees. The phase differences in Lyot are introduced in part because the thickness of each stacked birefringent crystal elements is different. The thickness and the birefringence each contribute to the retardation introduced. In the Lyot configuration, the retardation produced by the crystal at each stage is precisely twice the retardation from the crystal at the preceding stage. The bandpass wavelength is related to the thickness and birefringence of the crystals.

The successively varying stage thicknesses (e.g., 1d, 2d, 4d, 8d, etc. for Lyot) and the relative rotational alignment of the successive stages, are chosen to provide an arithmetic, geometric or other mathematical progression. The operation of the stages can be modeled mathematically and tested empirically. Multiple stage crystal devices have been demonstrated with 0.1 angstrom resolution (Title, A. M. and Rosenberg, W. J. Opt. Eng. 20, 815 (1981)). In order to achieve such resolution, dimensional precision is necessary, which makes the filters expensive. Often, resolution is improved simply by adding to the number of successive cells, sometimes using a large number of successive cells. This has the disadvantage of reducing the proportion of light that is transmitted versus the proportion that is rejected. Such filters are suited for astronomical applications wherein the filters are tuned to specific lines of the solar spectrum, where the source, like the Sun, is very bright.

Another variety of stacked crystal filter is the Solc filter. Like Lyot, the Solc filter uses multiple birefringent crystals in a stack, but unlike Lyot, the Solc filter does not require a polarizer between each birefringent crystal retarder. The Solc configuration better conserves available light energy. The Solc configuration uses birefringent crystals of equal thickness. Solc obtains multiple interfering wavefronts by varying the rotational orientation of each successive birefringent crystal.

Solc filters provide high finesse and high transmission ration using a cascade of identical phase retarders, without the need for polarizers between each of the retarders. Solc filters are described, for example, in Solc, J. Opt. Soc. Am. 55, 621, (1965).

The Solc filter is an example of a broader class of filter. In Harris et al., J. Opt. Soc. Am. 54, 1267, (1964), it is posited that any filter transmission function can be generated, in principle, using a stack of properly oriented identical retardation plates. Other researchers have used the network synthesis technique, along with standard signal processing methods, to generate filter designs based on this premise. These designs have sought high resolution over a limited spectral range, as opposed to a broad spectral range. The filters have fixed retardation elements. When tuning is to be considered, all the retardances are varied in unison.

The relative rotational angles between each birefringent crystal and the next preceding or succeeding crystal in a Solc configuration is a fraction of the rotation angle between the entrance and analyzer polarizers that precede and follow the stack. The Solc fan filter configuration has N identical crystals with rotation angles of $\theta$, $3\theta$, $5\theta$ . . . $(2N-1)\theta$, located between parallel polarizers where $\theta=\pi/4N$, and N is the number of crystals in the stack. The Solc folded configuration has N identical crystals oriented at $\pm\theta$ with respect to the incoming polarization where $\theta$ is the angle which the optic axis the crystal makes with the transmission axis of the entrance polarizer. The folded design has crossed polarizers.

A Solc "fan" arrangement, for example, might have four retardation elements and parallel polarizers. In such a Solc "fan" arrangement of four crystals (N=4), the first crystal is rotated 11.25 degrees relative to an input polarizer. The successive crystals are rotated by 22.5 degrees relative to the next preceding crystal. The output or analyzer polarizer is parallel to the entrance polarizer. A four retarder Solc "folded" arrangement by comparison has four stacked crystals placed alternately at clockwise and counterclockwise rotation angles relative to the polarizer, such as +11.25 degrees, −11.25, +11.25, and so on, and the analyzer polarizer is perpendicular to the entrance polarizer. Other variants are possible with different values for N, $\theta$ and the orientation of the polarizers.

The Solc configuration has advantages and disadvantages. Inasmuch as the crystals are all of the same thickness, a larger number of stages will fit in a longitudinally shorter stack than in a Lyot configuration. On the other hand, having more crystals in the stack increases the number of distinct crystals that need to be accurately sized and aligned.

Multiple stage crystal filters are dependent on the accuracy of their geometry. Manufacturing errors and temperature induced variations in dimensions and relative positioning may seem small, but in the context of optical wavelengths measured in the nanometers, variations in physical dimensions can be considerable. As a result, stacked crystal filters may need temperature controls to assume a nominal operational temperature, leading to further expense.

In the context of the present invention, birefringent stacked filters are applied to a spectral imaging apparatus such as a high performance Raman spectral imaging system. Such imaging applications require a very narrow bandpass and in general a high finesse (defined as the ratio of free spectral range to bandwidth: FSR/FWHM). The filter also needs to be tunable to selected wavelength pass bands.

Fixed retarders provide a phase delay determined by the birefringence of the crystal and the thickness of the crystal along the propagation axis. Electrically tunable birefringence filters have been proposed using liquid crystals as the tunable element. The birefringence of a liquid crystal typically is variable as a function of the amplitude of an electric field applied to the crystal. Changing the birefringence of a liquid crystal produces an effect that is similar to a change in the thickness of a fixed retarder.

In a Solc type stacked element filter, the configuration is that the birefringent crystal elements in the stack are of equal thickness and/or equal birefringence. The tunable elements are adjusted in unison. The stacked elements are successively aligned at specific rotational displacements, either in a progressive angular sequence or in an alternating "folded" configuration. In either case, the geometry (including birefringence and thickness) is such that the polarization state of the selected wavelengths traversing each stacked element aligns with the next element in a coordinated way. An input polarizer establishes a reference alignment. Any number of elements can be stacked in the body of the filter, with a larger number of elements generally providing higher resolution than a smaller number of elements. An output polarizer passes only the wavelengths that emerge from the stack with the nominal predetermined polarization alignment.

There are several choices for wavelength bandpass filter configurations that might be considered for a given use. There are constraints, however, that affect the choice, including performance considerations such as bandpass resolution and finesse. A high transmission ratio may be needed to obtain an acceptable signal strength, signal to noise ratios or image collection speed. A very bulky configuration may be unsuitable for desktop and portable applications. Another important measure is cost.

It would be advantageous to provide a configuration that takes into account most or all of the pros and cons of the respective choices and provides a high resolution arrangement with reasonable cost and other attributes.

SUMMARY OF THE INVENTION

It is an object of the invention to produce a wavelength bandpass filter with very good optical and operational characteristics, suitable for Raman imaging as well as other potentially demanding spectral imaging applications, at a reasonable cost. The term "spectral imaging" is construed as including but not limited to developing a spatially accurate wavelength resolved two dimensional image of a subject in selected wavelength images.

Another object is to provide an optimal choice of elements to maximize finesse while also ensuring a high transmission ratio. One technique for obtaining a high transmission ratio is use a Solc filter configuration, which requires only an input polarizer and an output polarizer, together with a stack of folded or successively angled birefringence stages.

Another technique comprises arranging Solc filter stages serially such that the finesse factors available from each of the successive stages multiply to provide the transmission function of the conjugate filter as a whole. It is important to note that the serial arrangement is a succession of complete Solc filters and not only a succession of birefringence retarder elements as typically of a conventional Solc filter arrangement. Each successive stage has an input polarizer, an output polarizer and a stack of equal birefringent elements between them. According to an advantageous aspect, the output polarizer of a given stage functions as the input polarizer for the next stage, the total number of polarizers being only one more than the number of stages.

The birefringence elements in each stage provide equal retardation (equal birefringence and typically equal thickness), which is an aspect of the Solc configuration. However according to another inventive aspect, the retardations and/or thicknesses of the different stages are not equal. Similarly, a different number of retardation elements can be included in the stacks of the successive stages. By varying the stages in this way, it is possible to superimpose the effects of stages that individually have only mediocre finesse but together have a very high finesse. For example, a stage having good free spectral range FSR values (i.e., a long span between periodically repeating bandpass peaks) may be provided, although that stage may have a relatively poor bandwidth resolution at its peaks (a disadvantageously large FWHM value). Among one or more next successive stages are included stages configured for advantageously narrow FWHM, although perhaps with a rather short free spectral range FSR. By coordinating the stages, and in particular by overlapping the pass band of two stages as described, the conjugate filter comprising both stages has the narrower FWHM and the longer FSR. These values of the two stages, the ratio of which is the finesse, are multiplied to provide the finesse value of the conjugate.

The conjugate filter as described preferably is tunable. The filter can comprise one or more tunable stages that use liquid crystal birefringence elements exclusively, and/or stages that use fixed retarders with coupled liquid crystals for adding a controllable retardation to the fixed retardation. It is also possible to include some stages that are tunable and others that are not tunable, in any case providing a serial superimposition of a wide free spectral range and narrow selected bandpass FWHM values therein.

In a practical embodiment, the conjugate filter need not have a wholly continuous free spectral range, instead having tunable selectable peaks that by conjugal tuning of stages is operable to select a plurality of bandpass peaks that do not include all possible center wavelengths continuously, but encompass a large number of closely spaced selectable bandpass wavelengths over the full tunable range.

These and other aspects will be made apparent by the following discussion and detailed disclosure of nonlimiting examples intended to demonstrate the invention of which the scope is defined in the following claims.

DETAILED DESCRIPTION OF THE INVENTION

In some spectral imaging applications, it is advantageous for a filter to have a very fine resolution while also being readily tunable. At the same time, it is desirable to have a strong signal level at the ultimate light responsive sensor elements, so as to have a good signal to noise ratio while obtaining images relatively quickly. It is a challenge to serve all these purposes at once, leading to design tradeoffs. According to an aspect of the invention, an optimized arrangement is provided to obtain tight bandwidth discrimination, high transmission ratio and tunability at least to a set of selectable wavelength bands. This is accomplished by employing multiple tunable Solc wavelength bandpass filter stages in series.

Any one of the Solc stages can have a modest value of finesse. Finesse is the ratio of free spectral range FSR (namely the wavelength span between bandpass peaks) versus the bandwidth of the peaks FWHM (full width measured at half maximum level).

According to one aspect of the invention, stages are serially arranged wherein the birefringence of the elements comprised by one stage is distinctly different from the birefringence of elements in another stage. As a result, the stages differ as to their respective contributions of free spectral range between periodic peaks (which is desirably large) versus the bandpass width of the individual peaks (which is desirably narrow). Other things being equal, a stage with a greater birefringence (typically greater retarder thicknesses) has advantageously narrower bandpass peaks than an otherwise comparable stage with less birefringence. That stage (with thicker or more birefringent retarders), however, has a disadvantageous short range between peaks. Conversely, a thin retarder stage (with lower birefringence) has wide bandpass peaks (peaks with poorer resolution) but the peaks are more widely spaced.

The transmission functions of the serially disposed filters apply progressively to the passing light signal. The transfer functions multiply. The finesse ratio of the overall multi-stage filter is the mathematical product of the finesse ratios of the stages. By serially applying the transfer functions of a stage with low birefringence to the output of a stage with higher birefringence (or vice versa), it is possible by action of the lower birefringence stage to select one bandpass peak in the succession of closely spaced narrow peaks provided by the higher birefringence stage. The multiplied transfer functions advantageously produce narrow peaks and wide free spectral range between peaks.

Preferably, both stages (or more than two stages if provided) are each tunable such that the bandpasses are coordinated to enable tuning to any desired wavelength in a tuning band. It is possible to tune the lower birefringence element to select a discrete narrow bandpass peaks from the transfer function of the higher birefringence element. If the lower birefringence element is sufficiently tunable, the tunable peaks can be used to select a narrow band in the transfer function of the higher birefringence element.

Figure 1:
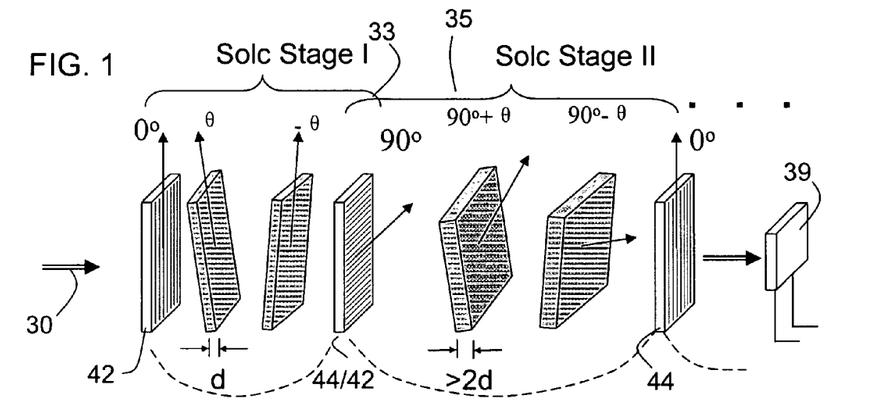
FIG. 1 is a schematic illustration of a multi-conjugate liquid crystal filter for spectral imaging applications and the like, according to the invention.

FIG. 1 illustrates the foregoing arrangements in a simplified schematic diagram. A light input signal, developed for example by microscope optics trained on a laser illuminated sample (not shown) produces a light signal 30 shown schematically as a single beam. A pixilated arrangement is also possible. The light signal 30 passes through plural filter stages 33, 35 and is collected at a photodetector 39, typically coupled in turn to a digitizer (not shown) or other means for processing the signal.

Figure 2:
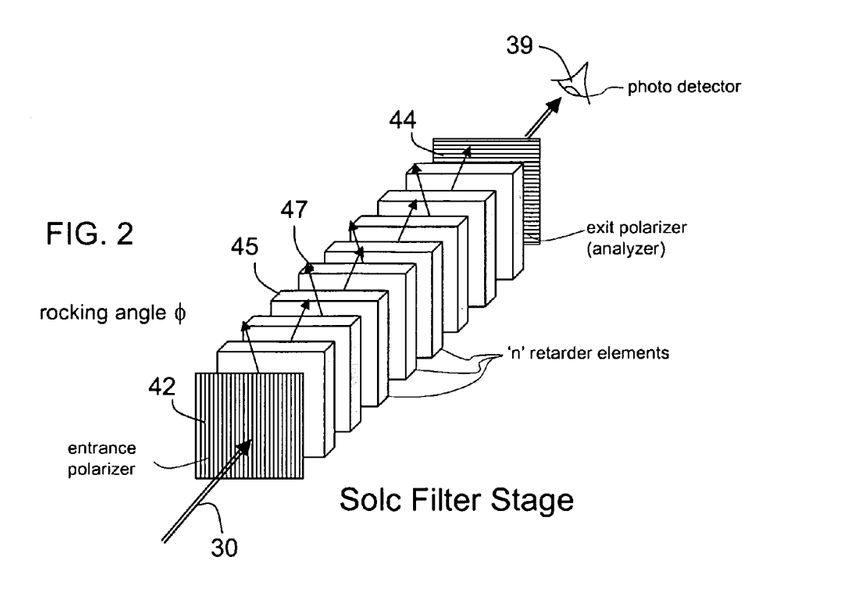
FIG. 2 is a schematic illustration of a single stage Solc fan configuration with multiple elements.

The stages 33, 35 are each functional Solc configuration wavelength bandpass filters. A Solc configuration has, as shown in FIG. 2, an entrance polarizer 42, an exit polarizer or analyzer 44 and a succession of retarder elements, 45, 47, etc. The entrance polarizer 42 and the exit polarizer 44 are plane polarizers having reference angles that are related by a predetermined rotation angle between zero and $\pi$ radians.

In the examples of FIGS. 1 and 2, the entrance and exit polarizers of each Solc stage are relatively rotated by $\pi/2$ or 90°. This angle is simply an example. Other angles are possible. In the example, assuming that light beam 30 is plane polarized in alignment, or at least includes a vector component in alignment with the entrance polarizer 42, the polarization component parallel to the reference angle of the polarizer passes through the entrance polarizer. In the example of a relative rotation of 90°, that component would be precisely mis-aligned to the exit polarizer 44 so that no light would pass. However, a number of retarder elements 45, 47 are provided between the polarizers 42, 44. Each of the retarder elements 45, 47 contributes an incremental amount of retardation due to birefringence. Each retarder element thereby re-aligns the polarization state of the beam.

Each retarder produces a phase delay between orthogonal components because of birefringence, namely the crystal property that the optical indices for light traversing the retarder is different for light that is aligned to orthogonal fast and slow axes of the crystal. Effectively, the optical propagation path is longer for one component and shorter for the other component. Whereas polarization is partly a matter of the phase relationship between orthogonal light components, a phase retardation of the components introduces a rotational change in polarization alignment. The polarization state is twisted by a particular angle determined by the birefringence of the retarder 45 or 47.

A given retardation distance amounts to a greater phase angle for shorter wavelengths and a lesser phase angle for longer wavelengths. Therefore, the twist angle that the retardation causes varies as a function of wavelength. In the embodiment of FIG. 2, the respective retarders are dimensioned and aligned at particular rocking angles $\phi$, which is known as a folded Solc configuration. In an alternative embodiment, the Solc configuration can be progressive, with each retarder being angularly rotated further than the preceding retarder by a particular angle, as opposed to alternating back and forth as shown. In any case the arrangement is the same: for a particular wavelength (and also certain wavelengths that are related periodically), the sum of the twist rotation angular differences from one retarder 45 to the next 47, through the progression, adds up to equal the rotational angle between the input and output polarizers 42, 44. Assuming that a range of wavelengths are present in the input signal 30, only certain wavelengths are retarded by the angle necessary to pass the exit polarizer 44.

The free spectral range is the difference between successive periodically related wavelengths that are passed by the filter stage. In general, a greater free spectral range is made available by using a smaller retardation. The extent of retardation is determined by the birefringence of the retarder material and by its thickness. As shown in FIG. 1, it is an aspect of the invention to use plural Solc filter stages, with the retardation provided (as shown by the thickness "d" and "2d" of the retarders) being different in the different stages.

The finesse of the filter is the ratio of FSR to FWHM, i.e., free spectral range to pass bandwidth of the passband peaks. The pass bandwidth FWHM can be made small by using a large number of retarders 45, 47, etc., in the serial stack of retarder elements in the respective Solc stage 33, or 35, etc. Again assuming that a range of wavelengths are present, the Solc filter provides a succession of stacked elements of equal retardation. Each element selects the required wavelength from the output of the preceding elements, which by virtue of equal retardation and nominal alignment have also selected for the required wavelength. By stacking a larger number of retardation elements, the selection can be made more discriminating.

Generally speaking, the FSR value of a Solc filter is inversely related to the extent of birefringence, which in a fixed retarder is proportional to thickness. The Solc filter configuration needs equal birefringence for each retarder element, and the rocking angle (or progressive twist angle) that divides the displacement angle from the entrance polarizer to the exit polarizer equally among the equally birefringent retarder elements. The requirement of equally birefringence and/or equally thick retarders in a Solc configuration would seem to prevent the use of different thicknesses or birefringences. According to an aspect of the invention, however, the thicknesses and/or birefringences are kept equal within each stage (thus maintaining the Solc configuration) but the thicknesses and/or birefringences of different stages between successive polarizers, are distinctly different.

It is possible to envision an electrically tunable Solc filter. There are challenges involved in that the liquid crystal retarder elements need to be correctly aligned, and their birefringence needs to be equal. Even in that case, there is typically a limited tuning range due to the practical limitations on the liquid crystal thickness.

According to an aspect of the invention, at least one of the Solc filter stages 33, 35, etc., and optionally all of the stages, comprise stacked retarders wherein the birefringence of individual retarders in the stack is contributed in part by a fixed retarder and in part by a tunable liquid crystal retarder that is optically coupled to the fixed retarder.

According to a certain embodiments, at least one of the Solc filter stages can have only tunable liquid crystal retarders. Moreover, the liquid crystal retarders can be limited to retarder elements that each are disposed successively at different rocking angles φ (see FIG. 2). Alternatively, the retarders can comprise two or more tunable and equally sized liquid crystal elements at each rocking angle, abutted against one another to provide multiple total thickness. The pairs (or trios, or quartets, etc.) are controlled in unison.

The effects of the successive Solc filter stages multiply because the filtering applied by each stage is superimposed on the filtering applied by the previous stage or stages. One or more thin-retarder Solc stages with large bandpass (large FWHM) but large free spectral range (high FSR) can be applied with one or more thicker-retarder Solc stages with narrow bandpass and small free spectral range (FSR). If the bandwidth of the former Solc stage is sufficiently narrow to effectively select one of the periodic peaks of the latter Solc stage, the result is that the finesse values of the filter stages are multiplied.

In this way, according to the present invention, it is possible to provide a conjugate filter having plural stages 33, 35, etc., wherein one or more stages such as stage 33 in FIG. 1 have retarders with equal but smaller birefringence, other stages such as stage 35 in FIG. 1 have retarders with greater birefringence, although equal within that stage. By multiplying the transmission functions of the Solc filter stages having greater and lesser birefringence, the finesse of the stages is multiplied. Because the stages 33, 35 are Solc stages (see also FIG. 2), only one output side polarizer is required to discriminate for the selected wavelength.

Figure 3:
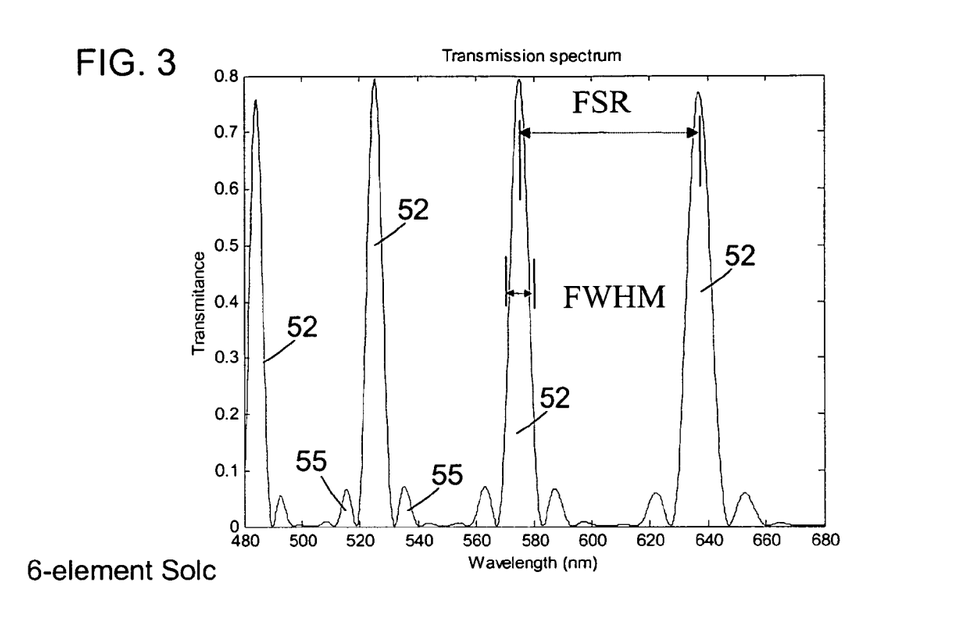
FIG. 3 is a spectral transmission plot showing the transfer function of an exemplary six element Solc filter.
Figure 4:
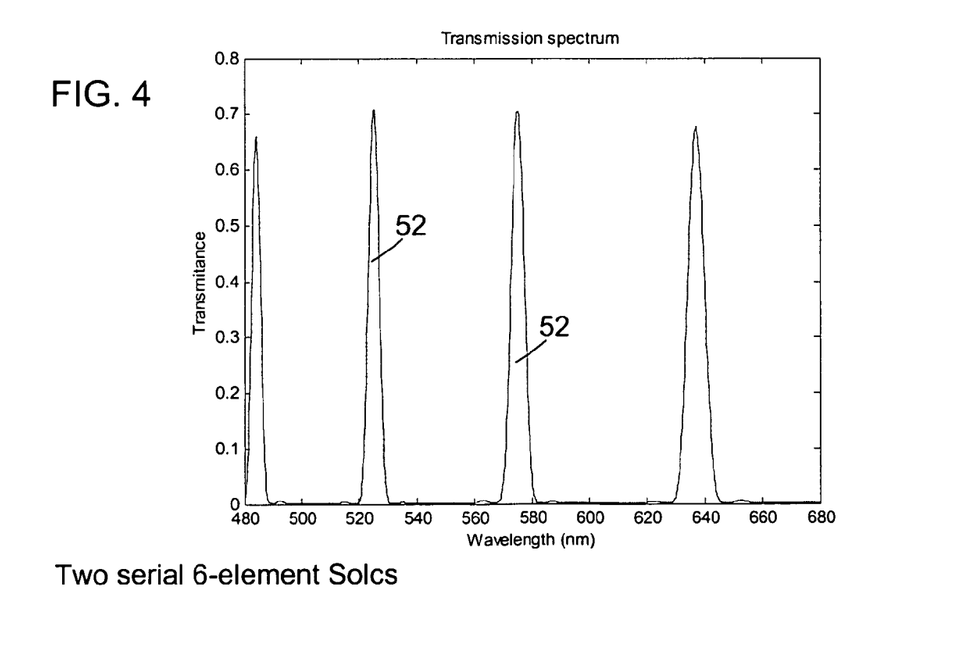
FIG. 4 is a spectral transmission plot corresponding to FIG. 3, wherein two six element Solc stages are arranged serially along a light transmission path.

FIGS. 3 and 4 illustrate the aspect of improving the filter finesse by providing multiple serial Solc filter stages with aligned spectral peaks so as to improve or narrow spectral resolution. FIG. 3 shows the transmission spectrum of a given Solc filter stage. FIG. 3 shows the transmission spectrum of two similarly configured stages that are placed in series. As shown in FIG. 3, the transmission spectrum of one stage has a given FWHM passband width on any one of the periodic peaks 52, separated by a free spectral range FSR. The spectrum of a stage typically has side-lobes 55, which are generally disadvantageous in a filter and tend to widen the effective FWHM bandpass peak and thus detract from finesse. As shown in FIG. 4, should two (or more) successive filter stages have the same or similar transmission spectrum, the combined effect is to narrow the FWHM passband, including reducing the amplitude of the side-lobes.

Figure 5:
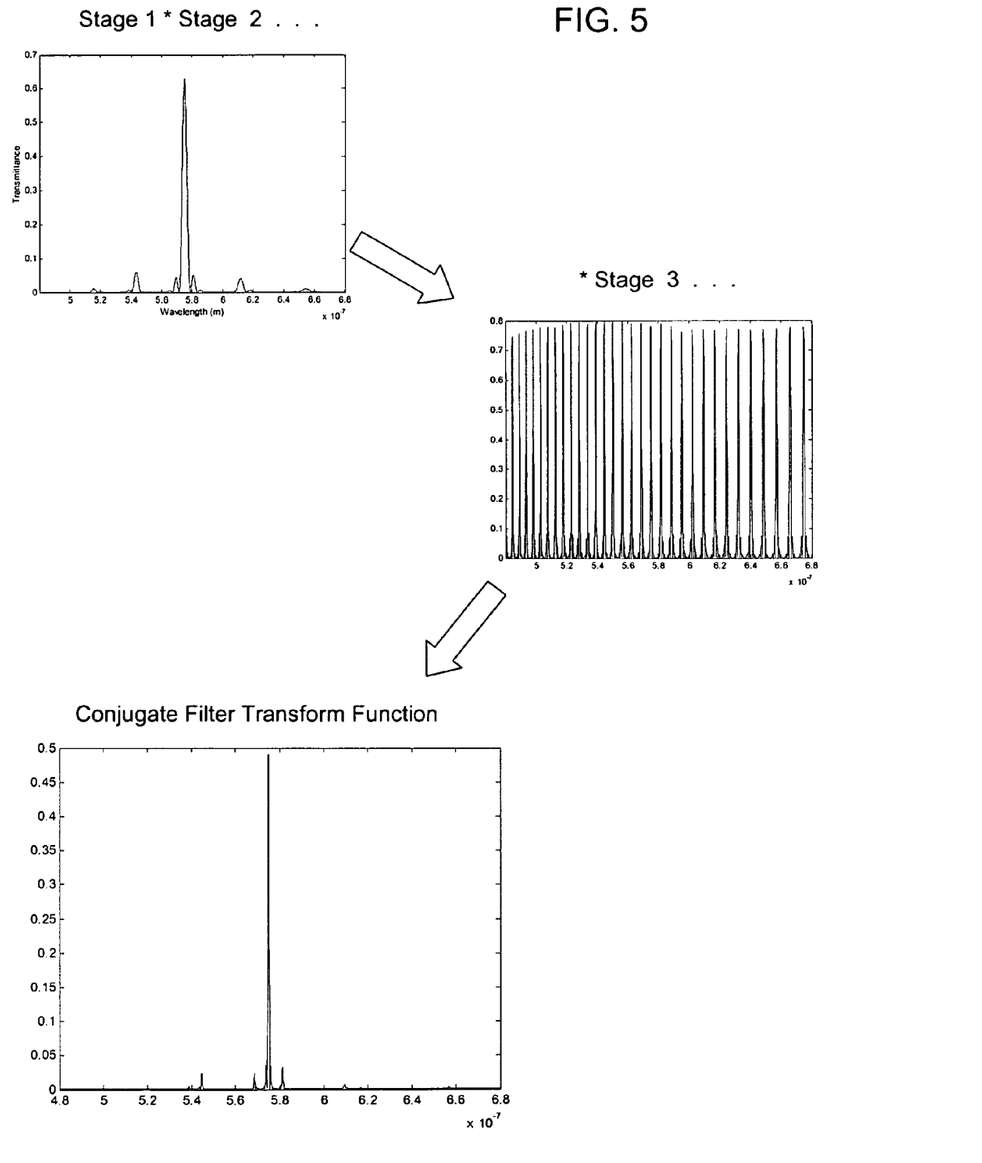
FIG. 5 is a schematic illustration showing how serially arranged Solc filters according to the invention, in this case one having a high free spectral range and the other having a narrow bandwidth, are conjugated to provide a high finesse with a good transmission ratio.

FIG. 5 shows another aspect of improving finesse wherein two (or more) spectrally aligned filter stages are provided wherein stages one and two in this example produce a bandpass peak over a particular free spectral range (the next peak for stages one and two is off the scale of this graph). That peak may have certain side-lobes and for purposes of illustration could have a FWHM width that is rather wide. However, when that spectrum is multiplied by the spectrum of stage three, which in this example has a narrow pass band but a disadvantageously short FSR, the conjugate filter result is characterized by a narrow passband and a wide FSR, i.e., by improved finesse.

As described, the inventive spectral imaging filter comprises at least two spectral filter stages 33, 35 coupled along an optical signal path. Each of the filter stages has a periodic transmission characteristic (e.g., FIG. 3) with bandpass peaks 52 separated by free spectral bandpass gaps FSR. In one embodiment, the filter stages are Solc stages that simply improve finesse by successively narrowing the bandpass peaks. In another embodiment, the two or more filter stages include at least one stage with greater free spectral range than the other, namely a larger gap between the bandpass peaks of said one of the filter stages, and the stages include at least one overlapping pass band. Thus, when the filter stages are conjugated or caused to multiply their transmission spectra in succession, the finesse of the conjugate pair includes a bandpass peak at the overlapping band.

Some improvement in finesse is available by successively applying similarly configured filter stages as in FIG. 4 versus FIG. 3, because the product of two identical transmission peaks is a narrow peak at the same center wavelength.

Substantial improvement in finesse can be provided, without reducing the overall transmission ratio unduly, by configuring the filter stages as Solc stages (thereby minimizing the need for polarizers) and wherein one of the conjugated stages has a longer free spectral range than the other of the two filter stages, which has narrower bandpass peaks. Provided that the bandpass peaks of said at least two filter stages overlap in an operative state of the filter, the transmission characteristic of the spectral imaging filter as a whole is characterized by the best characteristics of each stage, i.e., by the greater free spectral range of one and the narrower bandpass peaks of the other.

In one embodiment, the bandpass peak center wavelengths of one or more stages are determined by using fixed retarders as the birefringence elements in that filter stage. Preferably, however, at least one of the filter stages is tunable to the operative state wherein the bandpass peaks of said at least two filter stages overlap. Referring to FIG. 5, for example, by providing a tunable configuration wherein the bandpass peak wavelength of stages one and two is selectably movable over a range, that bandpass peak can effectively select one of the peaks in stage three, although stage three need not be tunable.

In another arrangement, stage three can also be tunable, whereby tunable selections of the periodic bandpass wavelengths of two stages of the conjugate filter that comprises a succession of serial stages, can be made in a coordinated manner so as to substantially continuously select any wavelength over a tuning range by tunably moving the bandpass peaks of the transmission spectra of plural stages.

In any event, one or preferably a plurality of the filter stages can be tunable to the operative state wherein at least one bandpass peak of the transmission spectra of all of the plurality of filter stages overlap. Thus the conjugate filter passes the overlapping band.

In FIGS. 1 and 2, the at least two filter stages 33, 35 comprise Solc filter configurations with a set of birefringent retarders 45, 47, etc., disposed between and distributed in rotational alignment between two polarizers 42, 44. The retarders within each of the stages provide equal retardation with the other retarders in the same stage. However, preferably the retarders in different ones of the stages produce distinctly different retardations. As a result, the spectral response of the stages typically differ with respect to the balance between FSR and FWHM values, for example as characterized by the stage one-stage two spectrum versus the stage three spectrum in FIG. 5.

One technique for providing tunable birefringence retarders is to employ tunable liquid crystal cells as the source of the birefringence. A liquid crystal conventionally comprises supporting plates of fused silica or the like (glass), spaced by a mechanical spacer to define a gap for the liquid crystal material. Between the plates and the liquid crystal are a transparent conductive layer for applying a control voltage, and an alignment layer that determines the resting alignment of the typically elongated liquid crystal molecules. The transparent conductive layer typically comprises indium tin oxide (ITO). Various alignment layers are possible, for example of $SiO_x$, that can be brushed or treated by ion bombardment or the like to establish the director orientation of the crystal. Applying a control voltage alters the birefringence of the liquid crystal. As a practical matter, increasing the birefringence produces an added phase delay between light component vectors aligned to the normal and extraordinary axes, the latter axis being the one affected by the applied control voltage.

Liquid crystals comprise certain chemical compounds that exhibit one or more liquid crystalline phases in which the molecules of the compounds are movably aligned. The material is birefringent when the molecules are aligned and the extent of alignment is variable to alter the birefringence.

In a preferred configuration, the liquid crystal cell used for the multi-conjugate filter of the invention is an electrically controlled birefringence (ECB) liquid crystal cell with parallel rubbing on the top and bottom substrate to establish the orientation of the molecules. Other liquid crystal modes also can be used, such as a vertically aligned nematic liquid crystal cell, a pi-cell, OCB cell or a bend cell. In another configuration, two of the above liquid crystal cells can be double stacked with each other to achieve better viewing angle characteristics.

Such a liquid crystal can be used as a retarder 45, or 47 or the like as described above, and has the further advantage of providing an electrically controlled birefringence that is much like a controllable retarder thickness. According to a further aspect of the invention, illustrated in FIG. 6, a controllably birefringent liquid crystal element is coupled to a fixed retarder, to provide a predetermined retarder thickness and birefringence wherein the controllable liquid crystal element contributes an added retardation subject to the applied control voltage. It is possible to employ a lithium niobate ($LiNO_3$) material for the retarder. However preferably, the retarders comprise bromium borate (BBO), so as to be approximately index matched to glass and/or used as a supporting plate of the liquid crystal structure as shown in FIG. 6.

Figure 6:
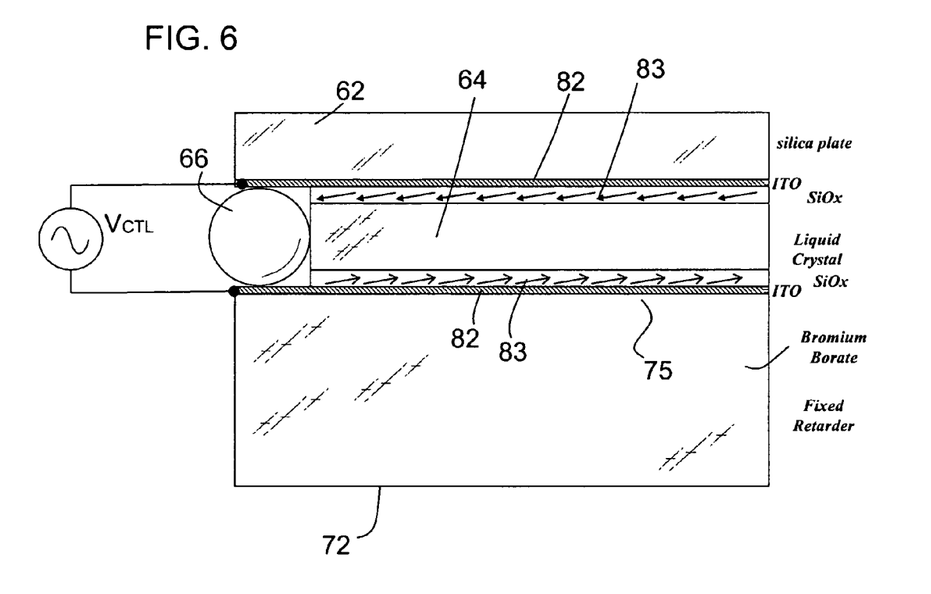
FIG. 6 is a schematic illustration of a tunable element to serve as a controllable birefringence in the embodiments of FIG. 1 or 2.

In FIG. 6, a silica plate 62 is spaced mechanically from a fixed retarder 72 by a spacer 66 and sandwiches a liquid crystal layer 64. ITO layers 82 allow application of a control voltage $V_{CTL}$. Alignment layers 83 determine the orientation of the liquid crystal director and thus the orientation of the fast and slow axes. The extent of retardation is determined by the controllable birefringence of the liquid crystal.

In the embodiment shown, the fast and slow axes of the liquid crystal 64 are aligned respectively to the fast and slow axes of the fixed retarder 72. Thus the liquid crystal contributes a controllable additional retardation between the same orthogonal vector polarization components that traverse the fixed retarder 72.

According to an aspect of the invention and as shown in FIG. 6, the liquid crystal 64 and the fixed retarder 72 preferably are substantially optically matched. For this purpose the fixed retarder advantageously comprises bromium borate. This material has an optical index of about 1.5 to 1.7 in the visible wavelength range, which is similar to the index of glass. By using a retarder with an optical index similar to glass, it is possible to omit an anti-reflective coating while reducing reflections at an interface between the retarder and a glass plate. If the optical index is mismatched at such an interface, multiple reflections can occur and detract from the transmission ratio. Other birefringence materials such as $LiNO_3$ have a higher index (e.g., 2.0 or 2.1) and are applicable to the invention but should be used with an anti-reflective coating or the like. Other birefringence materials such as calcite crystals may be applicable and may be more closely matched to glass than $LiNO_3$ may also be applicable but are not preferred due to their manufacturing challenges. Whereas birefringent materials have a different optical index along different axes, the index is matched only approximately with abutting isotropic materials such as glass. An approximate index match reduces reflections.

The foregoing materials and optical indices are directed to a hyperspectral filter in the visible wavelength spectrum. The invention is fully applicable to other spectra such as the near infrared or the ultraviolet, which are likewise useful in various chemical imaging applications.

The retarders 45, 47 in the respective stages can provide different retardations by having materials with different birefringence characteristics, or by a difference in thickness along the optical signal path using single retarder elements or thin elements that are aligned and abutted to form thicker ones, or by a tunable added birefringence, or by any combination of these different characteristics. Preferably, the retarders in at least one of the stages comprise a liquid crystal tunable birefringence element. It is possible that the retarders in one or more of the stages can consist of liquid crystal elements, i.e., to employ only liquid crystal for introducing birefringence and thus to lack a fixed retarder. Preferably, one or more stages includes retarders that employ both fixed retarders and liquid crystals. More preferably yet, the liquid crystals in those combined fixed and liquid crystal retarders are coupled together to form liquid crystal tunable birefringence elements wherein the fixed retarders contribute some of the retardation.

Figure 7:
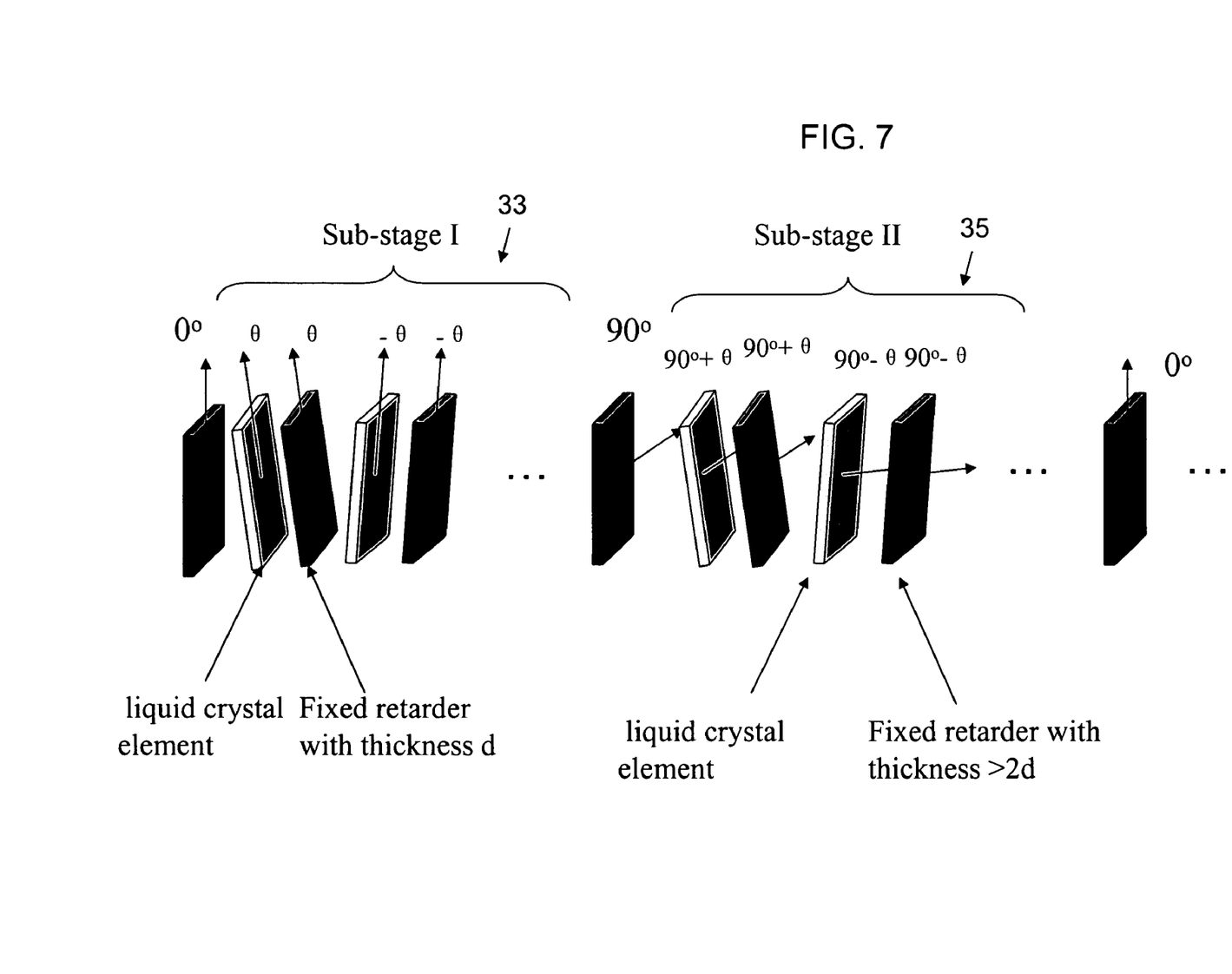
FIG. 7 is a schematic illustration of a two stage Solc filter according to the invention, with cooperating elements respectively having fixed and tunable retardations.

There are a number of different configurations possible according to the invention. FIG. 1 illustrates a simple schematic version. FIG. 2 shows one stage and shows that an indefinite number "n" of retarder elements can be used in a Solc configuration filter. FIG. 7 shows an arrangement of two stages wherein each retarder in each stage comprises a liquid crystal part and a fixed retarder part, the retardations being the same (and controllable in unison) within a given stage but differing from one stage to another, by thickness differences or by controlled differences in birefringence.

Figure 8:
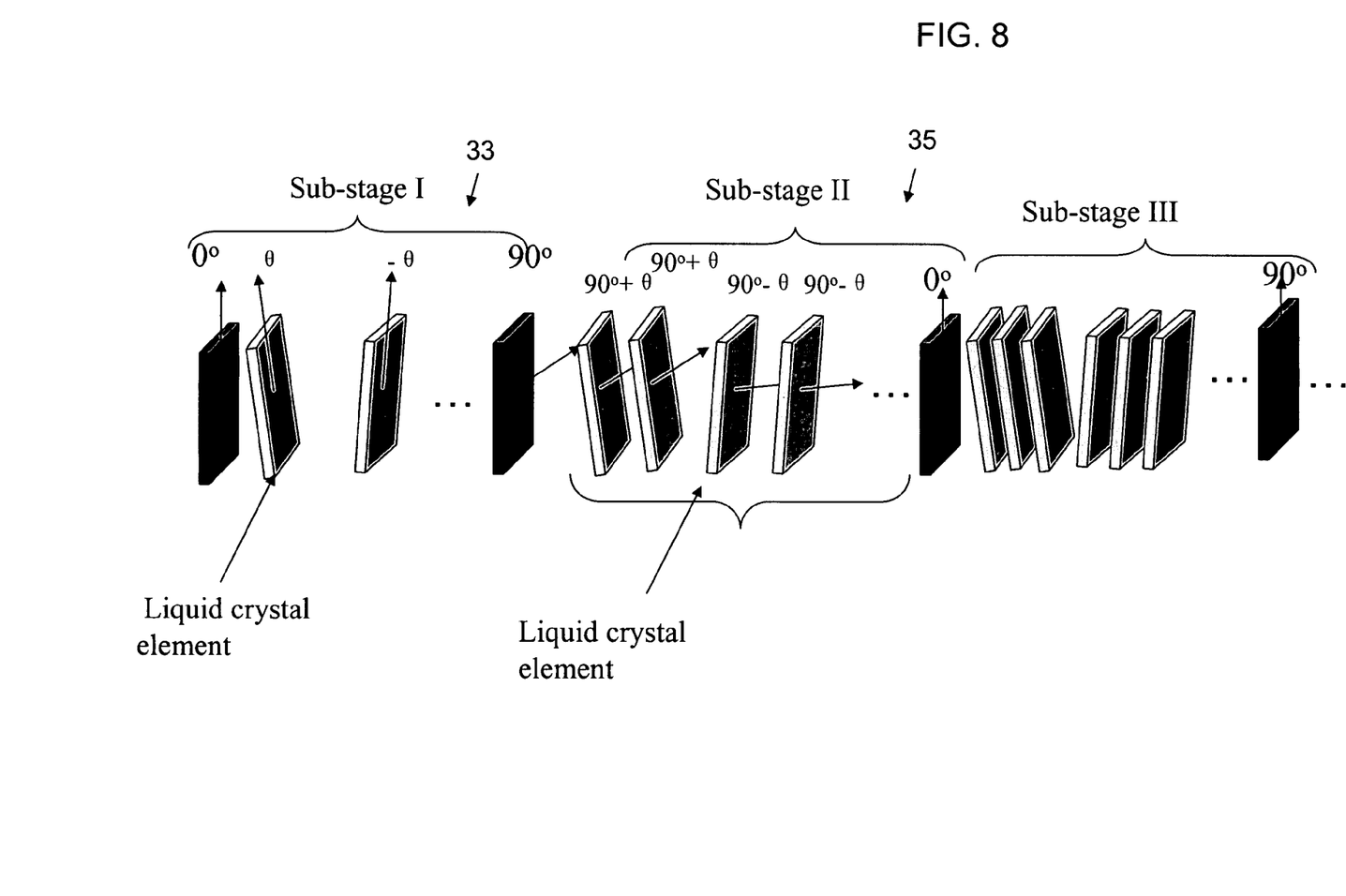
FIG. 8 is a schematic illustration of three stages in a configuration that can be expanded further.

In FIG. 8, at least three spectral filter stages are coupled along the optical signal path, The stages are separated by polarizers, such that the output polarizer for leading stages functions as an input polarizer for following stages. Thus the number of polarizers is limited to a number of stages, plus one. In FIG. 8, all of the retardation elements comprise liquid crystals, and the retardation elements at given rotational alignments comprise more than one liquid crystal.

In the advantageous arrangement shown in FIG. 8, the thickness of the retarders (which thickness differs among the stages) is determined by stacking a different number of liquid crystal controllable birefringence elements in the retarders for the different stages as the way in which the birefringence and thickness are made to differ from one stage to another. Thus the first stage in FIG. 8 has two rotationally rocked retarder elements that each have one liquid crystal element. The second stage has two aligned and stacked liquid crystal elements for each of the rotationally rocked retarders. The third stage stacks three liquid crystals for each element. Using a number of controllable but thin liquid crystals in a stack improves the tuning speed of the filter over use of thicker liquid crystals to obtain the same total birefringence. Furthermore, assuming that the tunable liquid crystal elements are of the same individual thicknesses, this arrangement produces stages wherein the retarder thickness in the successive stages are d, 2d, 3d, etc. (where "d" is the thickness of one element).

In the described embodiments wherein the cooperating retarders include one or more stages having retarder elements that are wholly or partly fixed retarders abutted with controllable liquid crystals, use of an index matched fixed retarder material such as bromium borate maintains the high transmission ratio obtained in general by use of stacked Solc configured filter stages of stacked retarders as described, namely by reducing reflections at discontinuities in the optical indices proceeding along the optical path.

Although generally applicable for high resolution wavelength discrimination, a preferred application for the inventive filter is as a tunable spectral filter for Raman imaging. Each of the filter stages comprises plural equally retardant rotationally distributed retarders leading into an output polarizer (namely Solc configured stages), and the output polarizer for leading stages functions as an input polarizer for following stages. The number of said stages, and the number and respective thickness of retarders within the stages, are chosen to provide a free spectral range from about 500 to 650 ηm and a FWHM bandpass peak width of about 0.25 ηm. This requires a filter finesse of at least 600 (i.e., 150 ηm FSR and 0.25 ηm FWHM). In that context, the required finesse can be obtained while limiting the number of spectral filter stages so as to obtain a reasonably good transmission ratio at the selected wavelength through the spectral filter.

The transmission loss from a polarizer is a function of the polarizer material, optical signal wavelength and similar factors. In the visible spectrum, a typical polarizer might have an exemplary transmission ratio of about 88% (i.e., a 12% loss) for light that polarized in alignment with the polarizer. Under that assumption, one Solc stage with an input polarizer and an output polarizer has a 77% transmission ratio due only to polarizer related losses. In the inventive multistage Solc configuration, each additional stage adds just one polarizer. Thus, three polarizers (two stages) allows a 68% transmission ratio, three stages 59%, four stages 52%, five stages 46%, six stages 40% and so on, attributable to polarizers. The finesse of the stages is multiplied as already described, and if each stage has the modest finesse ratio of about three, with six stacked stages one can exceed the necessary finesse of 600 with a transmission ratio of about 40%.

One characteristics of a birefringence filter as describe is that the operational wavelength region of the filter is mainly defined by the transmission spectrum of the polarizer used in the filter. The fixed retarder and the liquid crystal material generally have high transmission in a very wide range of wavelength spectrum. However, the transmission spectrum of the polarizer may be limited, e.g., to the UV, VIS, NIR or MWIR region. For the multi-conjugate filter of the invention, by selecting different types of polarizers, the filter can operate in the corresponding UV, VIS, NIR or MWIR wavelength region. An exemplary VIS polarizer can be NITTO DENKO's NPF series of polarizing film. Edmund Optics carries high contrast UV and NIR polarizers that can cover 365 ηm to about 1700 ηm. ColorPol series UV to NIR polarizers from CODIXX can cover the 350 to 2500 ηm wavelength region.

This is advantageous for many hyperspectral imaging applications that require collection of optical signal in a wide wavelength spectra.

A following set of tables is provided to illustrate certain specific embodiments of the multi-stage conjugate filter of the invention. By way of an explanation of the acronyms, these embodiments illustrate multistage conjugate filters (MCF) comprising multi-stage liquid crystal tunable filters (LCTF) in Solc configurations wherein a rotational displacement angle between two polarizers along the optical signal path is distributed among a set of equally birefringent retarders elements. Thus, a predetermined wavelength (which can be tunably selected), is successively rotated or twisted as to polarization state, by each of the birefringent elements, to become aligned to the second or exit polarizer. Other wavelengths are blocked.

In certain embodiments, each LCTF has a liquid crystal birefringence element, a fixed retardation plate and a polarizer. In other embodiments (or stages within a given embodiment), the retardation is supplied by liquid crystal tunable elements only. In the LCTF embodiments, the liquid crystals can be stacked.

Each stage has a Solc filter structure, but according to an inventive aspect, the retardation of the fixed and/or variable retarders is equal within a stage and has a particular difference between successive stages, to fulfill performance objectives. In particular, the retardation provided by some of the stages is distinctly greater than other stages, typically by employing fixed or variable retarders in some stages that are distinctly thicker than the retarders of other stages. In the embodiments discussed above, the difference can be at least a factor of two. The embodiments in the following tables illustrate other factors and the performances they can achieve.

In keeping with the invention, each stage of the multistage conjugate filter preferably has a finesse ratio greater than four (i.e., FSR/FWHM>4). More preferably, the finesse is greater than five. Also preferably, the ratio of the free spectral ranges of any two stages in the filter is greater than two, and more preferably greater than 2.5 (i.e., $FSR_1/FSR_2 > 2.0$ to 2.5). For a given retarder material, the FSR varies as a function of retardation or birefringence and thickness. Thus, generally the ratio of free spectral ranges produces a distinct difference in the thickness of the retarder plates in the Solc filter structures of at least two of the stages.

The individual retarders in a stage can comprise single birefringence layers, a fixed birefringence filter combined and preferably index-matched with a liquid crystal element, or multiple birefringence layers with fixed retarder and liquid crystal elements. The filter configuration can be a Solc folded configuration with a rocking angle as shown in FIG. 2, or alternatively the filter stages can be Solc fanout configurations, Solc Guassian, Solc linear, Solc Sinc or other configurations. In addition, the inventive multistage conjugate filter can have stages that are of different configurations as to the use of fixed and tunable retarders in the respective stages and as to cooperating stages that can use different ones of the various possible Solc filter configurations described.

One reason to employ Solc filter stage configurations is that the number of polarizers is limited to the polarizers provided between successive stages, and the output polarizer of a preceding stage can function as the input polarizer of the successively abutting stage. This results in an optimally high transmission ratio at the filter bandpass wavelength. However, in an embodiment where transmission ratio is not as important, it would also be possible to provide a different conjugate stage having, for example, a Lyot filter configuration or an Evans variant configuration.

A preferred embodiment comprises Solc filter stages. In stages having one or more fixed retarders, the fixed retarder can comprise a BBO or α-BBO material, with a refractive index close to glass. This has the advantage of reducing or eliminating the need for anti-reflective coatings between elements.

In this embodiment, each fixed retarder is followed immediately along the optical signal path by a liquid crystal birefringence element. The liquid crystal has a maximum retardation of less than five micrometers (5 $\mu$m).

According to an aspect of the invention, tuning the filter to encompass a full operative spectral range does not require shifting the peak of each independent stage across the full spectral range. The periodically repetitive peaks are tunable sufficiently to provide a series of tunably selectable wavelengths across the spectral range, at which the bandpass peaks align and thus gate the same tunably selected wavelengths through the succession of filter stage peaks. Typically, any particular periodic peak needs to be tunably movable over only a small fraction of the spectral range of the multiconjugate filter. The ability to selectively align different peaks from the periodic patterns of repetitive peaks of each of the stages (each peak of which may be tunable over only a modest free spectral range), enables a suitably configured control to set the stages to tuning states wherein ones of the periodic peaks of a given stage are selectively aligned with other peaks when tuning to a desired bandpass wavelength.

A plurality of LCTF tunable stages can be employed in this way to achieve a high out-of-band rejection ratio and narrow spectral bandwidth around the tuned bandpass wavelength. The multi-stage can use tunable and fixed retarder stages, but also can achieve differences in retardation from one stage to the next by using stacked liquid crystals with multiple abutted elements (or a larger number of multiple abutted elements) for the stages that need a greater thickness to achieve greater retardation than other stages.

The invention can use tunable LCTF retarder elements that comprise a relatively low birefringence or low dispersion liquid crystal material, and nevertheless achieve the desired free spectrum range (FSR) in the multiconjugate filter as a whole. Individual stages with low birefringence retarder elements can be used to exploit their larger free spectral spectral range. There may be a resulting sacrifice of spectral discrimination (the bandwidth is wide), but by repeating sub-stages and also by relying on the narrow spectral discrimination of other typically thicker-element stages, the conjugate filter achieves all the objectives of out of band rejection, tunability and wavelength bandwidth (FWHM) at the tuned bandpass wavelengths.

The various embodiments incorporated in this description include examples, a number of which are detailed in Tables 1 to 6 below. These embodiments have at least two stages, and preferably from three to six stages, each having at least two and preferably four or more retarders per stage. In another arrangement, six filter stages, each having at least four retarders are provided.

The following tables apply a shorthand notation for describing the stages, that illustrate the variations possible as to the number of retarder elements distributed among discrete folding or rocking angles between the polarizers of a stage (which determines the rocking angle), and the number tunable liquid crystal elements used to make up each element. The configuration of any LC only MCF can be expressed in such a way.

Assume that each single stage can be expressed as:

($i_k$, $m_k$, $\theta_k$), where the subscript k identifies the stage as $k^{th}$ stage in the filter, $i_k$ is the total number of elements in the $k^{th}$ stage, $m_k$ represents how many repeating LC elements are abutted at the same rocking angle (as shown in FIG. 8) in the $k^{th}$ stage, and $\theta_k$ is the rocking angle of the Solc element in the $k^{th}$ stage.

According to this short hand, the FluoMCF001 in Table 2, with a 2 stage folded 6 element Solc configuration at rocking angle ±7.5°, the first stage having 6 elements and the second stage 18 elements (and the same rocking angle of ±7.5°) can be expressed in the shorthand as: (6, 1, 7.5°)–(18, 3, 7.5°).

The FluoMCF002 in Table 2, has a 3 stage folded 6 element Solc with ±7.5° rocking angle. The first stage is 6 elements, the second stage 12 elements, and the third stage 12 elements, all having the rocking angle of ±7.5°, which can be expressed as: (6, 1, 7.5°)–(12, 2, 7.5°)–(12, 2, 7.5°)

Following this general expression for different configurations of multiconjugate filters having LC-only stages, a two stage filter is ($i_1$, $m_1$, $\theta_1$)–($i_2$, $m_2$, $\theta_2$);

a three stage filter is ($i_1$, $m_1$, $\theta_1$)–($i_2$, $m_2$, $\theta_2$)–($i_3$, $m_3$, $\theta_3$); and, a four stage filter is ($i_1$, $m_1$, $\theta_1$)–($i_2$, $m_2$, $\theta_2$)–($i_3$, $m_3$, $\theta_3$)–($i_4$, $m_4$, $\theta_4$).

Here $I_k$=2, 4, 6, 8, 10, 12, 14, 16, 18, 20, 22, 24, 26, 28, 30, 32, etc.;

$M_k$=1, 2, 3, 4; and, $\Theta_k$=22.5°, 11.25°, 7.5°, 5.625°, 4.5°, 3.75°, 3.21°, 2.81°.

There are a number of possible arrangements wherein a given set of retarders in a Solc configuration are used to subdivide the rotational angle between the input and output polarizers. There are also various possibilities for how many of the elements are tunable versus fixed. Finally, any particular element can be made up of one or more tunable birefringences that are tuned in unison. Employing several relatively thinner abutted liquid crystal elements to build up a relatively thicker retarder element, results in a filter that can be tuned more quickly than a filter using thicker tuned elements.

The retarders in at least one of the stages comprise liquid crystals that are coupled to a common tuning control. The birefringence of the retarders is caused to vary equally for all the retarders in a given one of the stages. Tuning the stage is thus functionally the same as changing the thickness of a set of equally dimensioned and equally birefringent retarders in the stage.

In another example, the retarders in at least two of the stages can comprise liquid crystals coupled to a tuning control for independently varying the birefringence for the retarders in respective ones of the at least two stages. However, the retarders in a given stage are tuned equally, preferably by varying two or more abutted liquid crystal elements, or alternatively wherein at least a subset of the retarders coupled to the tuning control comprises fixed retarders coupled to tunable liquid crystals.

TABLE 1

Examples of Fixed Retarder Multistage Conjugate Filters

| | |
|---|---|
| RamanMCFD001 | 5 stage folded, 6 element Solc with ±7.5° rocking angle |
| RamanMCFD002 | 6 stage folded, 6 element Solc with ±7.5° |
| RamanMCFD011 | 4 stage folded, 8 element Solc with ±5.625° |
| RamanMCFD012 | 5 stage folded, 8 element Solc with ±5.625° |
| RamanMCFD021 | 3–10 stage folded, 4 element Solc with ±11.25° |
| RamanMCFD031 | 2–10 stage folded, 10 element Solc with ±11.25° |
| RamanMCFD042 | 2–10 stage folded, 12 element Solc with ±11.25° |

TABLE 2

Examples of LC-only Filters

| | |
|---|---|
| FluoMCF001 | 2 stage folded 6 element Solc with ±7.5°, first stage 6 elements, second stage 18 elements with ±7.5°, (1-3)/6 configuration. |
| FluoMCF002 | 3 stage folded 6 element Solc with ±7.5°, first stage 6 elements, second stage 12 elements with ±7.5°, third stage 12 elements with ±7.5°, (1-2-2)/6 configuration. |
| Additional configurations having equally sized LC elements as retarders | (1-m)/k<br>(1-m-n)/k<br>(1-m-n-o)/k<br>m = 2 to 4<br>n = 2 to 4<br>o = 2 to 4<br>k = 4 to 16 | where "k" is the number of retarder elements in one stage;
"m" is the multiple of k for the elements in the next stage,
"n" the multiple of k in the third stage,
"o" in the fourth stage, etc.

TABLE 3

Exemplary Combined LC and Fixed Retarder Configurations

| | | |
|---|---|---|
| RamanMCFD101 | 5 stage folded 6 element Solc with ±7.5° | First stage an LC only stage |
| RamanMCFD102 | 6 stage folded 6 element Solc with ±7.5° | First stage an LC only stage |
| RamanMCFD111 | 4 stage folded 8 element Solc with ±5.625° | First stage an LC only stage |
| RamanMCFD112 | 5 stage folded 8 element Solc with ±5.625° | First stage an LC only stage |
| RamanMCFD121 | 3–10 stage folded 4 element Solc with ±11.25° | First stage an LC only stage |
| RamanMCFD131 | 2–10 stage folded 10 element Solc with ±11.25° | First stage an LC only stage |
| RamanMCFD142 | 2–10 stage folded 12 element Solc with ±11.25° | First stage an LC only stage |

TABLE 4

Performance Comparison

| | RamanMCFD101 | RamanMCFD102 |
|---|---|---|
| Number of Stages | 5 | 6 |
| Fixed retarder material | Quartz, α-BBO | Quartz, α-BBO |
| Liquid Crystal element | MLC6080, d = 6.5 um | MLC6080, d = 6.5 um |
| Free Spectrum range | 500 ηm to 650 ηm | 500 ηm to 650 ηm |
| Sub-Stage design | 6 element Solc with ±7.5°folded | 6 element Solc with ±7.5°folded |
| FWHM at 500 ηm | 0.15 ηm | |
| FWHM at 575 ηm | 0.21 ηm | 0.16 ηm |
| FWHM at 650 ηm | 0.28 ηm | |
| Out of band rejection ratio | $2*10^{-2}$ | $1.2*10^{-3}$ |
| Polarizer Transmission ratio at 550 ηm | ~approx. 45% | ~approx. 38% |

TABLE 5

RamanMCFD101 - materials, thickness and alignment

| Stage | Design | Component | Material | θ | d (μm) |
|---|---|---|---|---|---|
| 1 | 6 element Solc with ±7.5° folded | LC cell | MLC6080 | 7.5 | 6.5 |
| 2 | 6 element Solc with ±7.5° folded | Fixed retarder<br>LC cell | Quartz<br>MLC6080 | 7.5<br>7.5 | 600<br>6.5 |
| 3 | 6 element Solc with ±7.5° folded | Fixed retarder<br>LC cell | Quartz<br>MLC6080 | 7.5<br>7.5 | 1800<br>6.5 |
| 4 | 6 element Solc with ±7.5° folded | Fixed retarder<br>LC cell | α-BBO<br>MLC6080 | 7.5<br>7.5 | 50<br>6.5 |
| 5 | 6 element Solc with ±7.5° folded | Fixed retarder<br>LC cell | α-BBO<br>MLC6080 | 7.5<br>7.5 | 1350<br>6.5 |

TABLE 6

RamanMCFD102 - materials, thickness and alignment

| Stage | Design | Component | Material | θ | d (μm) |
|---|---|---|---|---|---|
| 1 | 6 element Solc with ±7.5° folded | LC cell | MLC6080 | 7.5 | 6.5 |
| 2 | 6 element Solc with ±7.5° folded | Fixed retarder<br>LC cell | Quartz<br>MLC6080 | 7.5<br>7.5 | 600<br>6.5 |
| 3 | 6 element Solc with ±7.5° folded | Fixed retarder<br>LC cell | Quartz<br>MLC6080 | 7.5<br>7.5 | 1800<br>6.5 |
| 4 | 6 element Solc with ±7.5° folded | Fixed retarder<br>LC cell | α-BBO<br>MLC6080 | 7.5<br>7.5 | 50<br>6.5 |
| 5 | 6 element Solc with ±7.5° folded | Fixed retarder<br>LC cell | α-BBO<br>MLC6080 | 7.5<br>7.5 | 1350<br>6.5 |
| 6 | 6 element Solc with ±7.5° folded | Fixed retarder<br>LC cell | α-BBO<br>MLC6080 | 7.5<br>7.5 | 1350<br>6.5 |

The foregoing tables demonstrating practical embodiments should be considered as nonlimiting examples.

The patents and publications noted in the background and the detailed description are available and their teachings and further citations are to be deemed to be incorporated into this disclosure by reference.

The invention having been disclosed and illustrated by examples, various modifications and variations can be seen as possible in light of the above teachings. It should be understood that the invention is not limited to the embodiments specifically used as examples, and reference should be made to the appended claims to assess the scope of the invention in which exclusive rights are claimed.

We claim:

1. A spectral imaging filter, comprising:
   at least two spectral filter stages coupled along an optical signal path, wherein each of the at least filter stages has a periodic transmission characteristic with bandpass peaks separated by free spectral bandpass gaps;
   wherein one of the two filter stages has a greater free spectral range than the other of the two filter stages, between the bandpass peaks of said one of the filter stages;
   wherein said other of the two filter stages has narrower bandpass peaks than said one of the two filter stages;
   wherein the bandpass peaks of said at least two filter stages overlap in an operative state of the filter, whereby a transmission characteristic of the spectral imaging filter as a whole is characterized by said greater free spectral range and said narrower bandpass peaks.

2. The spectral imaging filter of claim 1, wherein at least one of said at least two filter stages is tunable to said operative state wherein the bandpass peaks of said at least two filter stages overlap.

3. The spectral imaging filter of claim 2, wherein a plurality of said at least two filter stages is tunable to said operative state and wherein the bandpass peaks of said plurality of filter stages overlap.

4. The spectral imaging filter of claim 1, wherein the at least two filter stages comprise Solc filter configurations comprising a set of birefringent retarders disposed between and distributed in rotational alignment between two polarizers, the retarders within each of the stages providing equal retardation with others of the retarders in the same one of the stages.

5. The spectral imaging filter of claim 4, wherein the retarders in different ones of the stages produce a different retardation.

6. The spectral imaging filter of claim 5, wherein the retarders in at least two of the different stages differ in retardation by at least a factor of two.

7. The spectral imaging filter of claim 6, wherein the retarders in said stages provide said different retardation by one of a difference in materials, a difference in thickness along the optical signal path, and a tunable difference.

8. The spectral imaging filter of claim 7, wherein the retarders in at least one of the stages comprise a liquid crystal tunable birefringence element.

9. The spectral imaging filter of claim 7, wherein each of the retarders in at least one of the stages consists of a liquid crystal element.

10. The spectral imaging filter of claim 7, wherein the retarders in at least one of the stages comprise fixed retarders coupled to liquid crystal tunable birefringence elements.

11. The spectral imaging filter of claim 10, wherein the fixed retarders are index matched to at least one portion of the liquid crystal tunable birefringence elements.

12. The spectral imaging filter of claim 11, wherein the fixed retarders comprise bromium borate.

13. The spectral imaging filter of claim 4, wherein each of the filter stages comprises plural rotationally distributed retarders leading into an output polarizer, whereby the output polarizer for leading stages functions as an input polarizer for following stages, wherein a number of said stages, and a number and respective thickness of retarders within the stages, are chosen to provide a free spectral range (FSR) from about 500 to 650 $\eta$m and a full width half maximum bandpass peak width (FWHM) of about 0.25 $\eta$m.

14. The spectral imaging filter of claim 13, wherein a number of said spectral filter stages is limited such that a transmission ratio of a selected wavelength through the spectral filter is at least about 40%.

15. The spectral imaging filter of claim 13, comprising at least three filter stages each having at least four retarders.

16. The spectral imaging filter of claim 13, comprising six filter stages, each having at least four retarders.

17. The spectral imaging filter of claim 13, wherein the retarders in at least one of the stages comprise liquid crystals coupled to a common tuning control for varying a birefringence equally for the retarders in said one of the stages.

18. The spectral imaging filter of claim 17, wherein the retarders in at least two of the stages comprise liquid crystals coupled to a tuning control that for independently varying the birefringence for the retarders in respective ones of the at least two stages.

19. The spectral imaging filter of claim 18, wherein at least a subset of the retarders coupled to said tuning control comprise fixed retarders coupled to the liquid crystals.

20. The spectral imaging filter of claim 18, wherein at least some of the stages comprise tunable retarders having a plurality of abutting rotationally aligned liquid crystals that are tunable in unison.

21. The spectral imaging filter of claim 1, comprising at least three said spectral filter stages coupled along the optical signal path, each of the stages leading into an output polarizer, whereby the output polarizer for leading stages functions as an input polarizer for following stages and a number of said polarizers is limited to a number of stages plus one.

* * * * *